(12) United States Patent
Baird et al.

(10) Patent No.: US 12,544,617 B1
(45) Date of Patent: Feb. 10, 2026

(54) ADAPTIVE PROGRAMMABLE DEVICE FOR REHABILITATION OF PHYSICAL DISABILITY

(71) Applicants: David Baird, Newnan, GA (US); Tim Riedel, Lagrange, GA (US); John Brook, Senoia, GA (US)

(72) Inventors: David Baird, Newnan, GA (US); Tim Riedel, Lagrange, GA (US); John Brook, Senoia, GA (US)

( * ) Notice: Subject to any disclaimer, the term of this patent is extended or adjusted under 35 U.S.C. 154(b) by 75 days.

(21) Appl. No.: 18/631,261

(22) Filed: Apr. 10, 2024

Related U.S. Application Data

(60) Provisional application No. 63/458,234, filed on Apr. 10, 2023.

(51) Int. Cl.
| | | |
|---|---|---|
| *A63B 21/00* | (2006.01) | |
| *A63B 21/068* | (2006.01) | |
| *G06F 3/041* | (2006.01) | |
| *G16H 20/30* | (2018.01) | |

(52) U.S. Cl.
CPC .... *A63B 21/4045* (2015.10); *A63B 21/00181* (2013.01); *A63B 21/068* (2013.01); *G06F 3/0412* (2013.01); *G16H 20/30* (2018.01)

(58) Field of Classification Search
CPC ............ A63B 21/00181; A63B 21/068; A63B 21/4045; G06F 3/0412; G16H 20/30
See application file for complete search history.

(56) References Cited

U.S. PATENT DOCUMENTS

| | | | | |
|---|---|---|---|---|
| 5,322,489 | A | | 6/1994 | Webb et al. |
| 5,346,280 | A | * | 9/1994 | Deumite .................. A61G 5/14 297/DIG. 10 |
| 5,419,752 | A | * | 5/1995 | James ...................... A61H 1/02 482/7 |
| 6,821,234 | B1 | * | 11/2004 | Barbee ................. A61H 1/0255 482/57 |
| 7,789,812 | B2 | * | 9/2010 | Anderson ................ A63B 7/04 482/96 |
| 7,942,783 | B2 | * | 5/2011 | Ochi .................. A63B 23/0405 482/8 |
| 8,152,700 | B2 | | 4/2012 | Adams |
| 8,388,499 | B1 | * | 3/2013 | Rindfleisch ........ A63B 23/1209 482/8 |
| 9,289,338 | B1 | * | 3/2016 | Swenson ................ A61G 5/125 |

(Continued)

*Primary Examiner* — Joshua Lee
(74) *Attorney, Agent, or Firm* — Sandy Lipkin

(57) ABSTRACT

The instant invention is a device for aiding and enabling physical rehabilitation of patients with lower body disabilities. It is adaptable to a wide population of patients with varying sizes, bodyweights, conditions and pathologies. By customizing kinetic and kinematic movement parameters through the programmable control system, patients and therapists can start at an existing disabled state and progress to the desired rehabilitated state. The device is configured around a "Sit-to-Stand" movement which is a medical and therapeutical industry standard which can be measured and rated. Throughout the therapy motion, the patient is safely constrained and guided through a biomechanically sound pathway. Usage data is collected, stored and managed into reports in formats that are prescribed by doctors, therapists and insurance entities. The device is developed to be effective patient rehabilitation, efficient use of time and effort, and productive for clinical or home use.

18 Claims, 11 Drawing Sheets

(56) References Cited

U.S. PATENT DOCUMENTS

| | | | |
|---|---|---|---|
| 9,415,293 B1 | 8/2016 | Wang | |
| 9,565,947 B2 * | 2/2017 | Oblak | A63B 23/0405 |
| 9,775,757 B1 * | 10/2017 | Borgman | A47C 7/14 |
| 9,855,457 B2 | 1/2018 | Wang | |
| 11,413,494 B1 * | 8/2022 | Habing | A63B 21/225 |
| 2015/0217156 A1 | 8/2015 | Meredith et al. | |
| 2024/0293696 A1 * | 9/2024 | Fink | A63B 22/0089 |

* cited by examiner

ADAPTIVE PROGRAMMABLE DEVICE FOR REHABILITATION OF PHYSICAL DISABILITY

REFERENCE TO PRIOR APPLICATION

This application claims priority of the provisional patent application 63/455,234, filed Apr. 10, 2023 entitled REHABILITATION DEVICE FOR SIT TO STAND TRAINING by Davdi (sic) Baird and Tim Reidel (sic).

BACKGROUND OF THE INVENTION

Field of the Invention

The field of this invention relates generally to devices in the field of physical disability rehabilitation and more particularly toward a device that is programmable and can incrementally increase load for sit to stand training, among other things.

DESCRIPTION OF THE PRIOR ART

The field of physical disability rehabilitation requires the administration of therapeutic exercise. Therapists use both manual and device-assisted techniques to restore a patient's musculoskeletal functionality. Disabilities can occur due to injury, surgery, disease, age and other causes. Specifically, the aim of rehabilitation is to promote healing and restore or improve strength and mobility. Patients who have experienced sudden loss of previous abilities from injury, surgery, etc., seek recovery. Those who have suffered gradually declining abilities from age, disease, etc., seek improvement to extend independent living and prevention of setbacks such as injury from falls.

In all cases, healing and restoration is induced by increasing joint mobility and stability, muscle strength, neuromuscular control and connective tissue integrity. Therapy techniques include massage, temperature treatment, manipulation, etc., to stimulate healing. The restoration and improvement of musculoskeletal function involves some form of progressively increasing load resistance and movement range. It is such application of progressive demand on the body that the instant invention addresses.

A standard measure of physical condition that is accepted in the medical, physical therapy and insurance industries is the "SIT-TO-STAND" (STS) test. It has been established to be a reliable indication of a patient's ability to sustain an independent lifestyle and a predictor of fall-injuries. It is used to gauge a person's current condition, training progress and eligibility for insurance-paid therapy. The testing consists of having the subject start from a seated position on a chair, standing unassisted under their own power, returning to the seated position and repeating the movement as many times as they can in a certain time allotment. According to the number of repetitions they can complete in the specified time, the individual is assigned a performance rating. The rating is used to judge the subject's physical condition.

The object of the instant invention is to enable a patient to train themselves to an improved ability—a higher rating score—on the STS test protocol.

It is a further object of the instant invention to have application beyond the objectives of the STS, such as injured athletes and otherwise healthy individuals who have sustained injury or required surgical repairs that may expect a higher degree of restored physical function beyond the STS.

It is a further object of the instant invention to provide assistance to individuals with more extreme disability, and lower expectations than STS, that can benefit from the invention, such as stroke and spinal cord injury victims, who have experienced gains from neuromuscular therapy and stimulation. Such patients, however, need greater bodily support and safety restraint to offset their physical deficiencies. The instant invention can suit their unique needs.

While the needs and conditions of different patients pursuing therapeutic rehabilitation can vary greatly, the instant invention is configured to accommodate the differences. Patient strength, joint mobility, neuromuscular control, coordination and size (height, weight, limb length) differ in magnitude and degree among individuals. The invention device is imbued with adaptable controls, adjustments, and features to address the great extent of patient needs.

There exists no other prior art devices that effectively solve the problems presented in rehabilitating disabled patients as the instant invention device does. While delivering acceptable results in the STS or aiding recovery from other lower body disabilities, the range of patient accommodations (precision, adjustment, control, operating modes) are uniquely provided by the instant invention device.

Some devices on the market that are described as sit-to-stand assistance are limited to transferring patients from one location or position to another. These prior art devices do not offer physical training for rehabilitation. Other STS devices offer an assist to the patient to stand from a wheelchair, but without progressive load training and with no range-of-motion control.

One such device offers a graduated weight plate assist, but without speed or range-of-motion control and requires the patient to be capable beyond what many are. Therefore, the invention device stands alone in its ability to accommodate, train, support therapists' efforts and effectively rehabilitate a full range of patients.

SUMMARY OF THE INVENTION

The basic embodiment of the present invention teaches a rehabilitation device to facilitate and promote therapeutic rehabilitation of lower body disabilities comprising: a chair-like carriage that supports a patient through therapeutic movement, said chair-like carriage further comprising a footrest; a drivetrain that lifts said carriage through a proscribed path by a bearing follower mechanism on a machined curvilinear surface; a force plate in said footrest of said chair-like carriage that senses the magnitude of patient push effort; an electronic control system that coordinates sensor inputs, a PLC, and software programs to direct output motion according to an operational algorithm; an HMI touchscreen for a user to enter operative settings and display operating characteristics; a CPU for digital memory and data management software to collect, store and organize usage data; and a housing enclosure that provides for safety, stability and portability.

The above embodiment can be further modified by defining that said chair-like carriage is an ergonomic support structure that further comprises: a seat, backrest, headrest, and a shoulder restraint.

The above embodiment can be further modified by defining that said chair-like carriage is adjustable to accommodate patients of different anthropometric dimensions.

The above embodiment can be further modified by defining that it is further comprising programmable motion limits to protect a patient's mobility constraints.

The above embodiment can be further modified by defining that it is further comprising programmable lift force to assist a patient's strength limitation.

The above embodiment can be further modified by defining that it is further comprising programmable travel speed to optimize movement rate training.

The above embodiment can be further modified by defining that it is further comprising electromechanical switches to provide emergency safety override in the event of control system malfunction.

The above embodiment can be further modified by defining that a guided motion is designed to provide natural biomechanical movement along a seated-to-standing path.

The above embodiment can be further modified by defining that said device is foldable and transportable.

The above embodiment can be further modified by defining that said force plate in said footrest sends electric signals to a PLC that is proportional to patient push effort.

The above embodiment can be further modified by defining that it is further comprising an auto detect mode that senses the magnitude of push effort registered by said footrest and automatically adapts drivetrain output force to lift said chair-like carriage.

The above embodiment can be further modified by defining that said carriage can be declined at variable degrees to compensate for patient instability during the upward standing movement.

The above embodiment can be further modified by defining that said guide mechanism further comprises padded, curved spinal support surfaces in the cervical, thoracic and lumbar regions.

The above embodiment can be further modified by defining that a prime mover and motion transmission components assist a disabled patient to complete rehabilitative movements.

The above embodiment can be further modified by defining that it further comprises precision lift control with increments of 0.1 or more pounds of force.

The above embodiment can be further modified by defining that that it further comprises precision position control with increments of 1 mm or more.

The above embodiment can be further modified by defining that it further comprises precision speed control with increments of 1 mm/see or more with smooth continuous motion.

That above embodiment can be further modified by defining that said HMI touchscreen further comprises controls for: engaging a dialog for profile data entry; choosing from a menu of operating modes; establishing kinematic and kinetic movement parameters; counting and timing movement repetitions; and tracking, charting and displaying performance measurements.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1A:
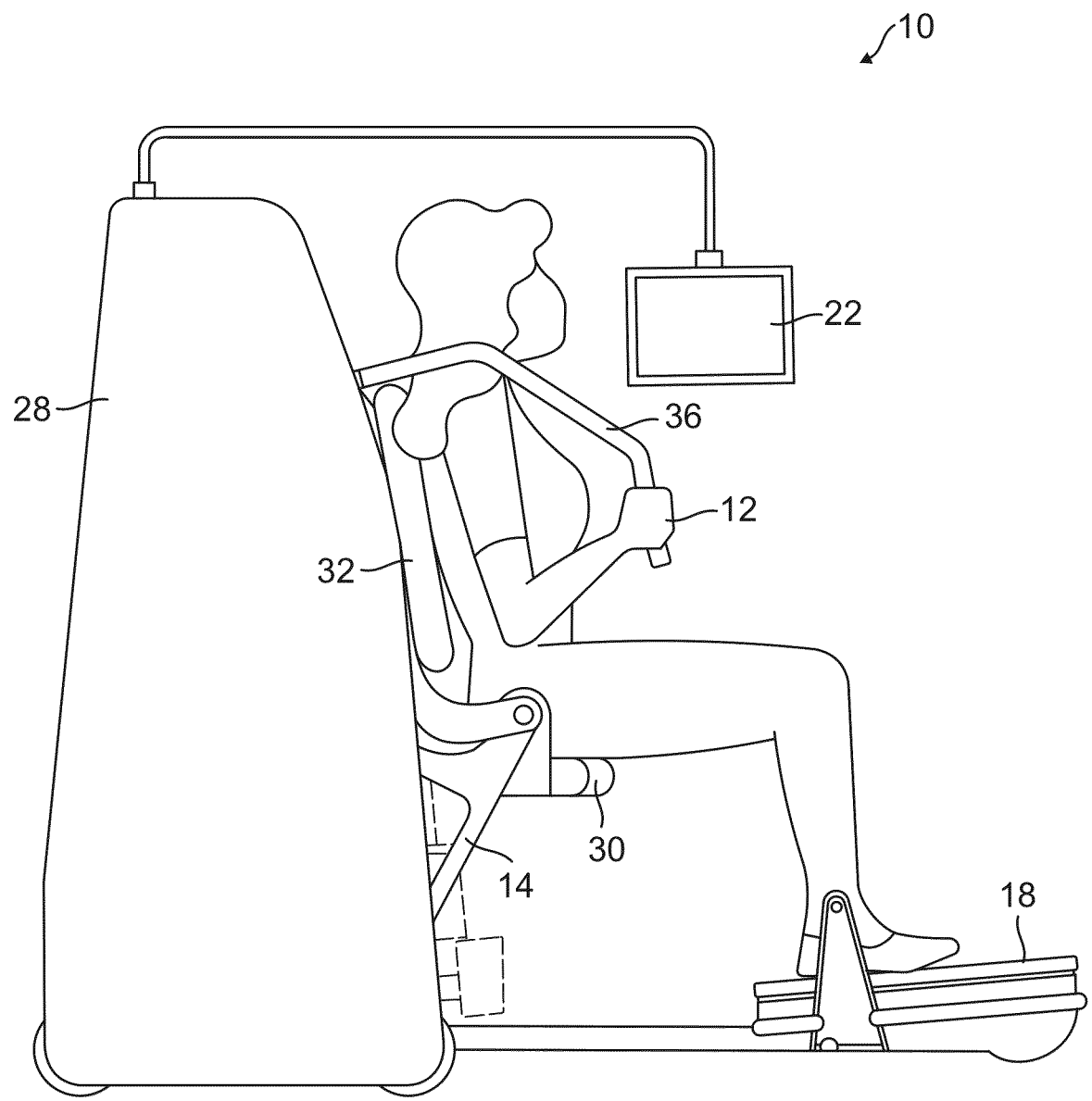
FIG. 1A is a side view of the device of the instant invention with a user in the sit position.

Turning to the drawings, the preferred embodiment is illustrated and described by reference characters that denote similar elements throughout the several views of the instant invention.

The preferred embodiment of the instant invention provides for a device that starts a patient from a seated position. The device is adjusted to fit the patient's individual dimensions. After entering the amount of lift assist that the patient needs to proceed, upper and lower travel limits are set to the patient's restricted range-of-motion. The lift assist amount is determined by the patient's strength condition, and the travel limits are determined by the patient's joint mobility restrictions. In most cases, a trained physical therapist determines the settings for the patient. Once initial setup is completed, the patient initializes movement by pushing with their feet against the footrest. Force sensors in the footrest signal the control system PLC. According to setup data and mode selection, the PLC directs the output force and speed of the drive train.

In addition to assisting the patient with the necessary lift force, the speed of movement is optimized per individual, with too fast being damaging and too slow being unduly fatiguing. The patient is lifted through a guided path toward a standing position. The starting and stopping points of the "standing" motion are governed by the patient's joint mobility and safely contained within the travel limits. For motion to proceed and continue, the patient must generate their portion of lift force which was predetermined by their strength condition. If for any reason the patient fails to generate their part of lift force, motion stops. There is no unsafe, uncontrolled motion. The instant invention device provides the remaining lift force necessary to raise the patient to the upper movement limit. Repetitions of the movement are performed as per therapy guidelines. With prescribed usage, the patient progresses in strength and mobility until reaching their rehabilitation goals.

Figure 1B:
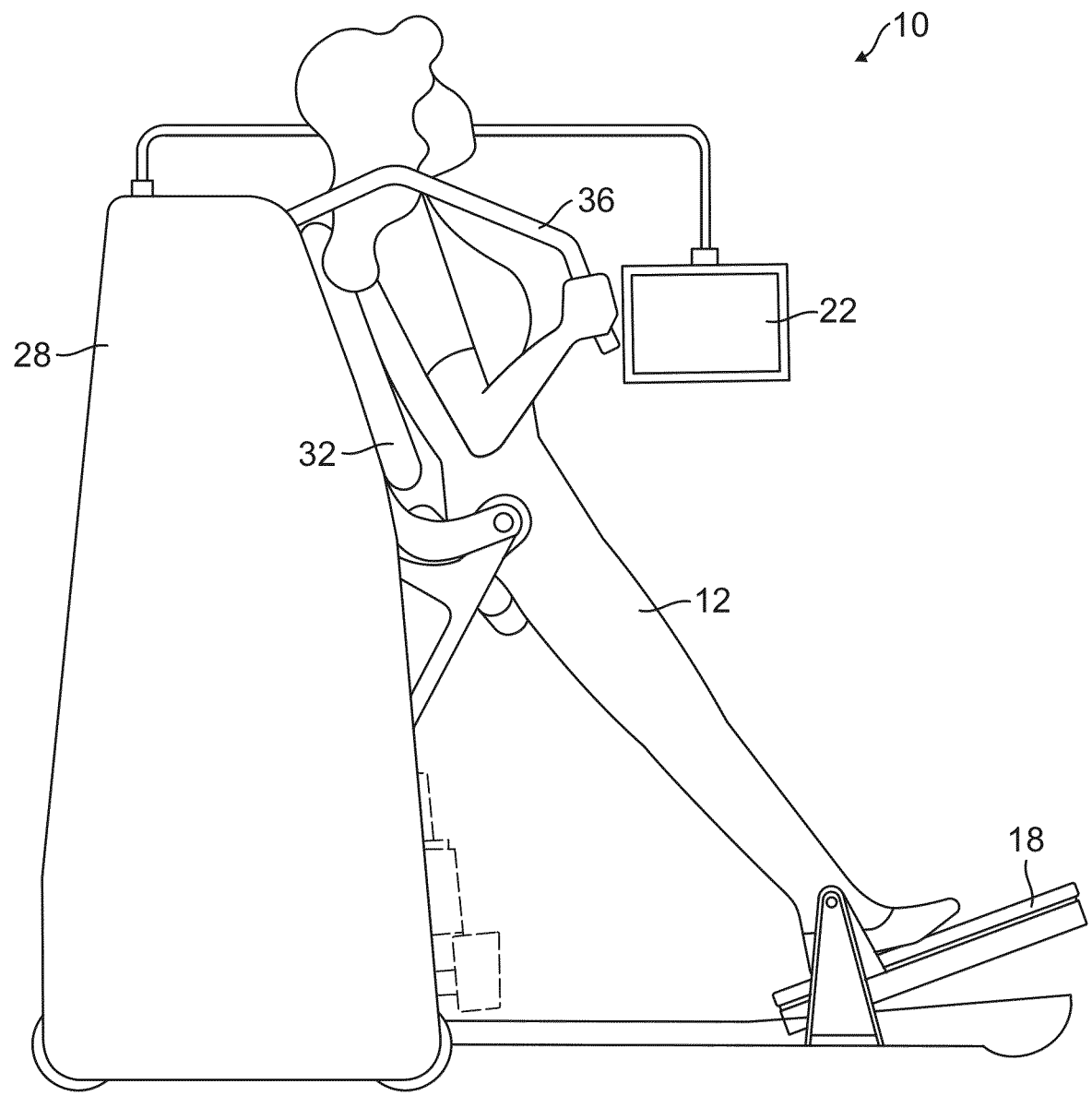
FIG. 1B is a side view of the device of the instant invention with a user in the stand position.

The device 10 of the instant invention is a machine that enables rehabilitation of lower-body disability with a supported, variable assist, guided natural motion for a patient 12 throughout a range of movement from seated (See FIG. 1A) to standing (See FIG. 1B).

Figure 2:
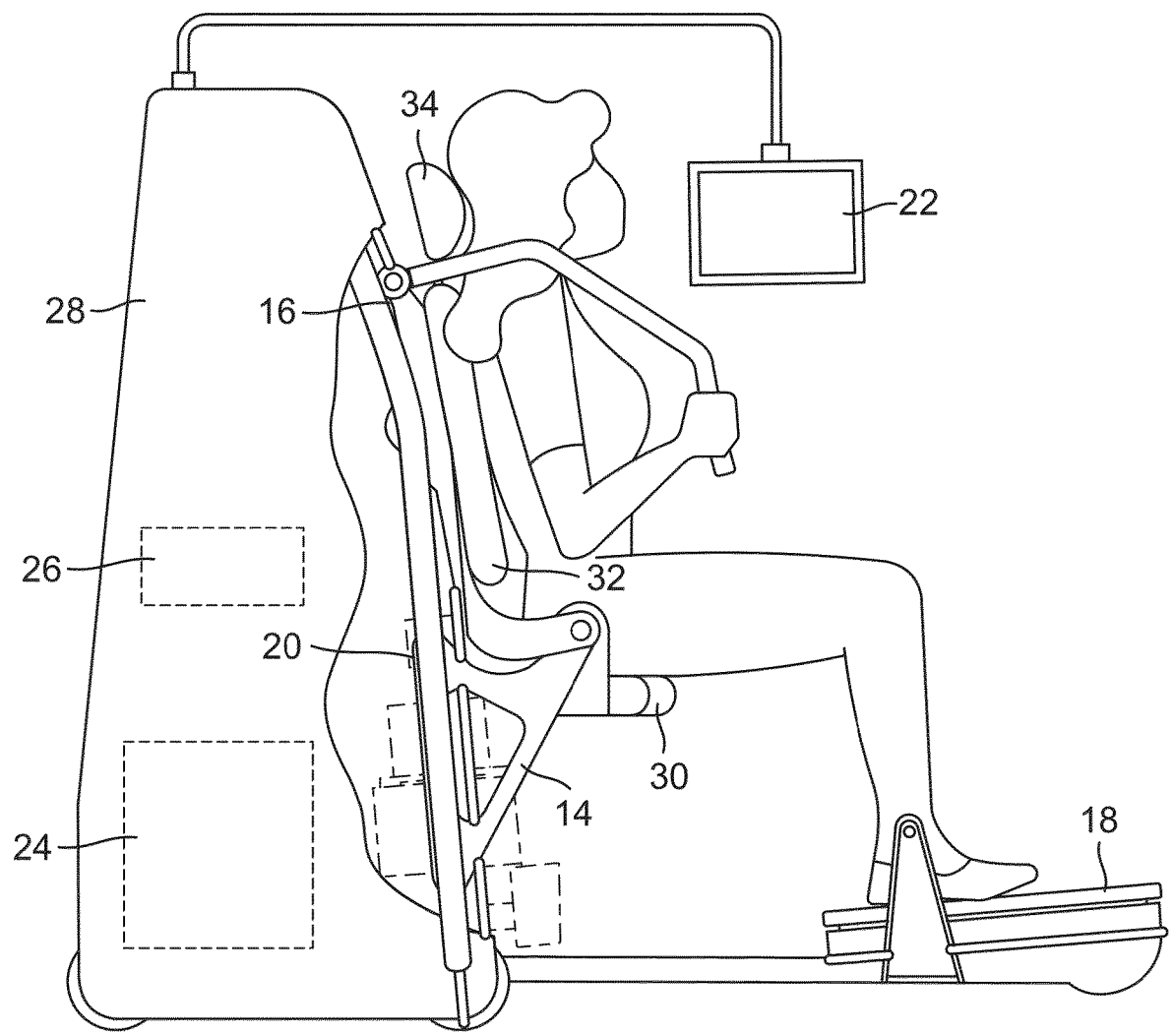
FIG. 2 is the view shown in FIG. 1A with the device components identified.

The device 10 of the instant invention consists of the following components as seen in FIG. 2: a carriage 14 that the patient 12 occupies and which supports them; a guide mechanism 16 that constrains the carriage 14 along a movement path; a footrest 18 which registers the patient's leg push effort; a drivetrain system 20 that assists lifting the patient 12 to the degree they lack; an HMI screen 22 for user interaction with the invention; an electronic control system 24 that along with various sensor and program inputs, controls the operation of the invention; a CPU 26 with digital memory and software programs to record, trend, and report patient use and progress; and a frame and body structure 28 that integrates the mounting, enclosing and arrangement of the invention assembly.

Figure 3:
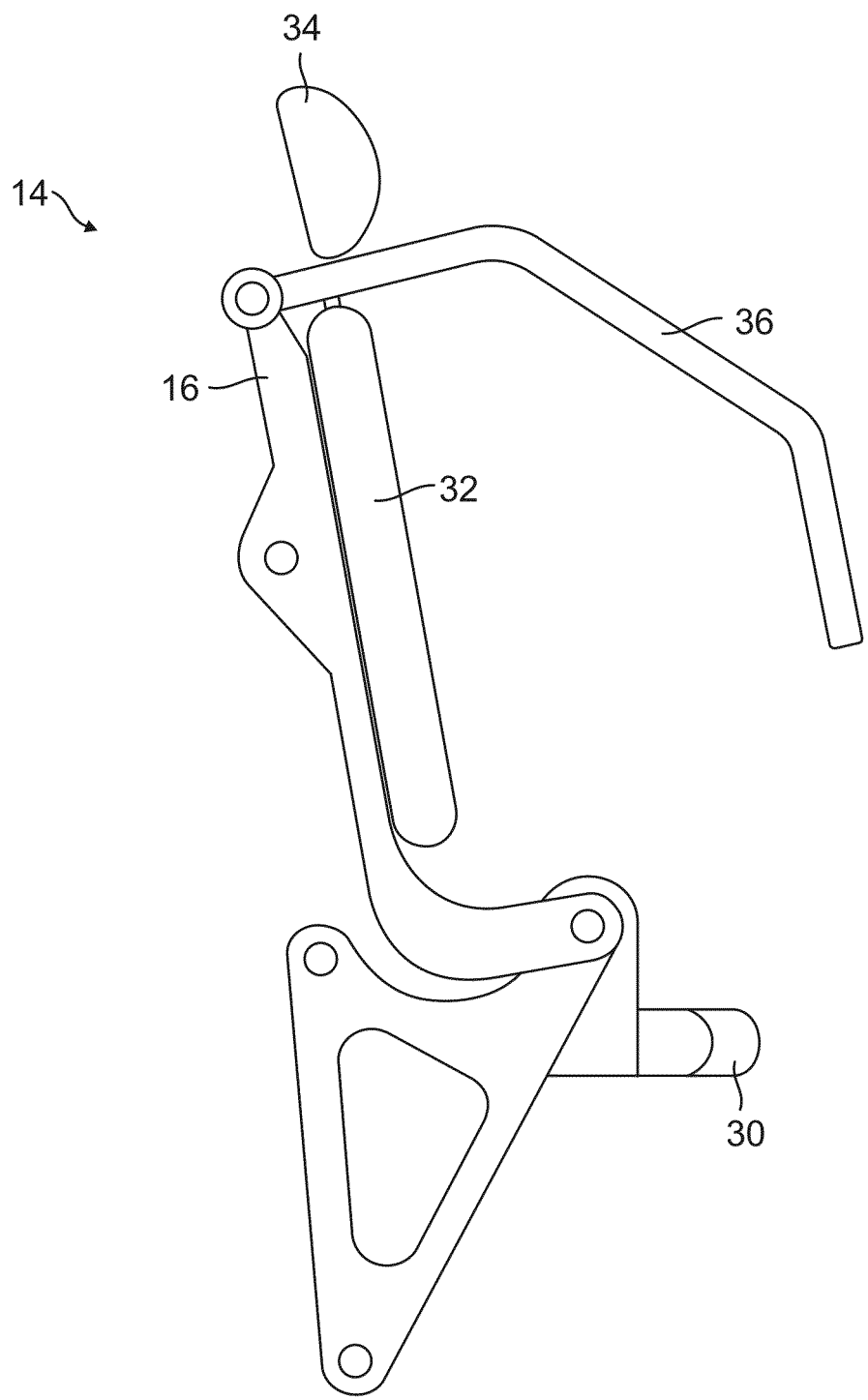
FIG. 3 is a side view of the carriage assembly of the instant invention.

The carriage 14 as seen in FIG. 3 includes a seat 30, backrest 32, headrest 34, arm rests and shoulder constraints 36 for the patient 12. Each is adjustable to accommodate different patients and their requirements. It is attached to bearing followers that ride on the guide mechanism.

Figure 4:
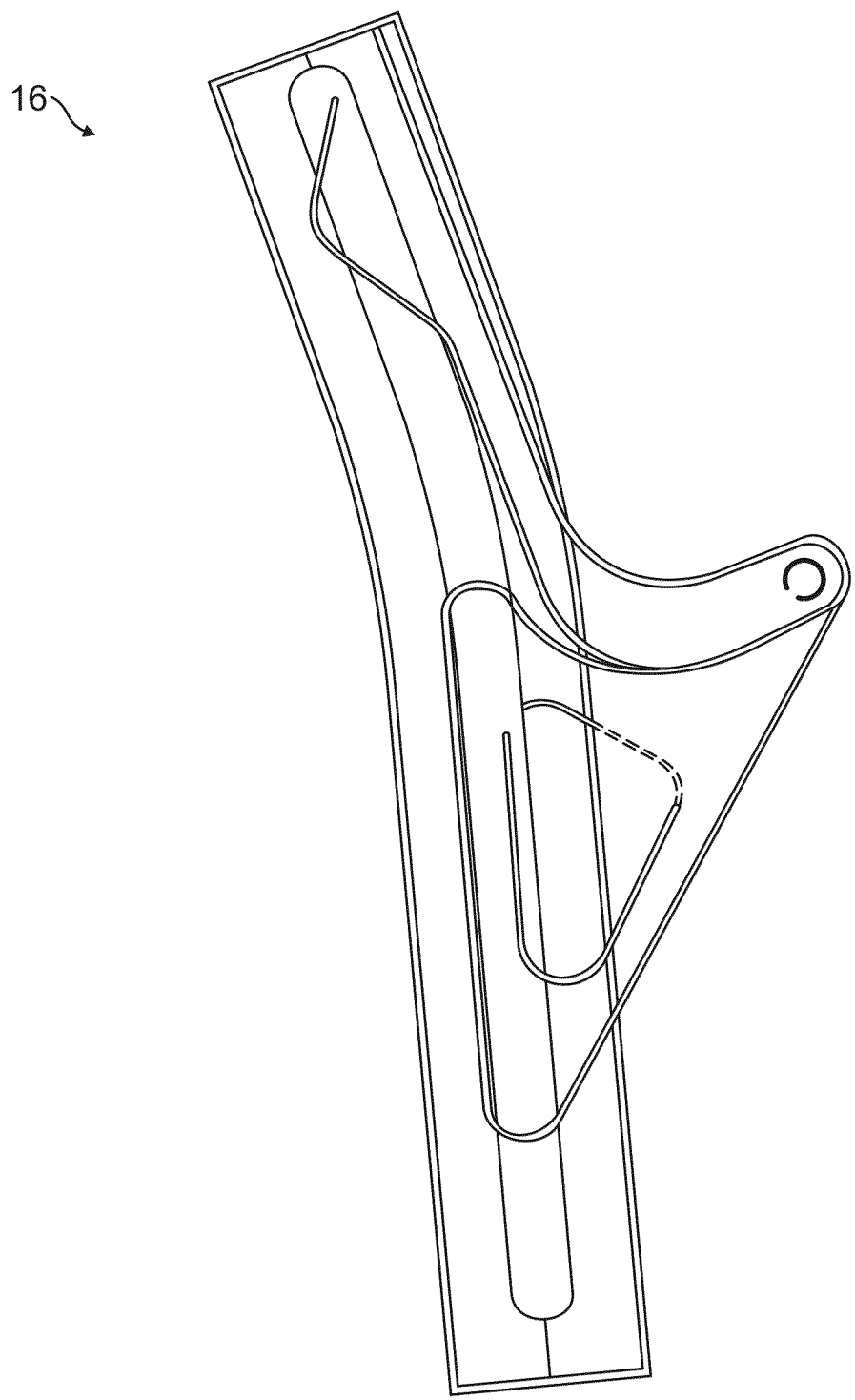
FIG. 4 is a side view of the guide path mechanism of the instant invention.

The guide mechanism 16 as seen in FIG. 4 directs the drivetrain 20 and patient push forces along a proscribed design path. It has machined curvilinear surfaces which constrain the path of the bearing followers on the carriage 14.

Figure 5:
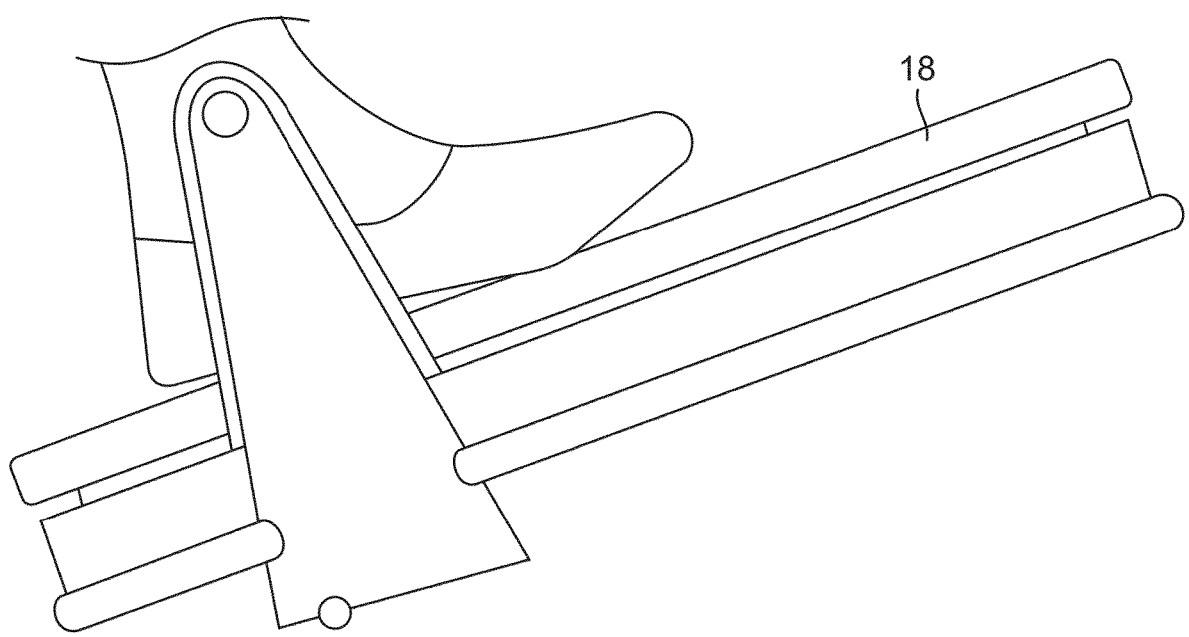
FIG. 5 is a side view of the foot rest of the instant invention.

The footrest 18 as seen in FIG. 5 is a platform for the patient to place their feet and push onto. Within the footrest 18 is load cell circuitry that senses the magnitude of push force that the patient generates and sends a calibrated electrical signal to the control system PLC.

Figure 6:
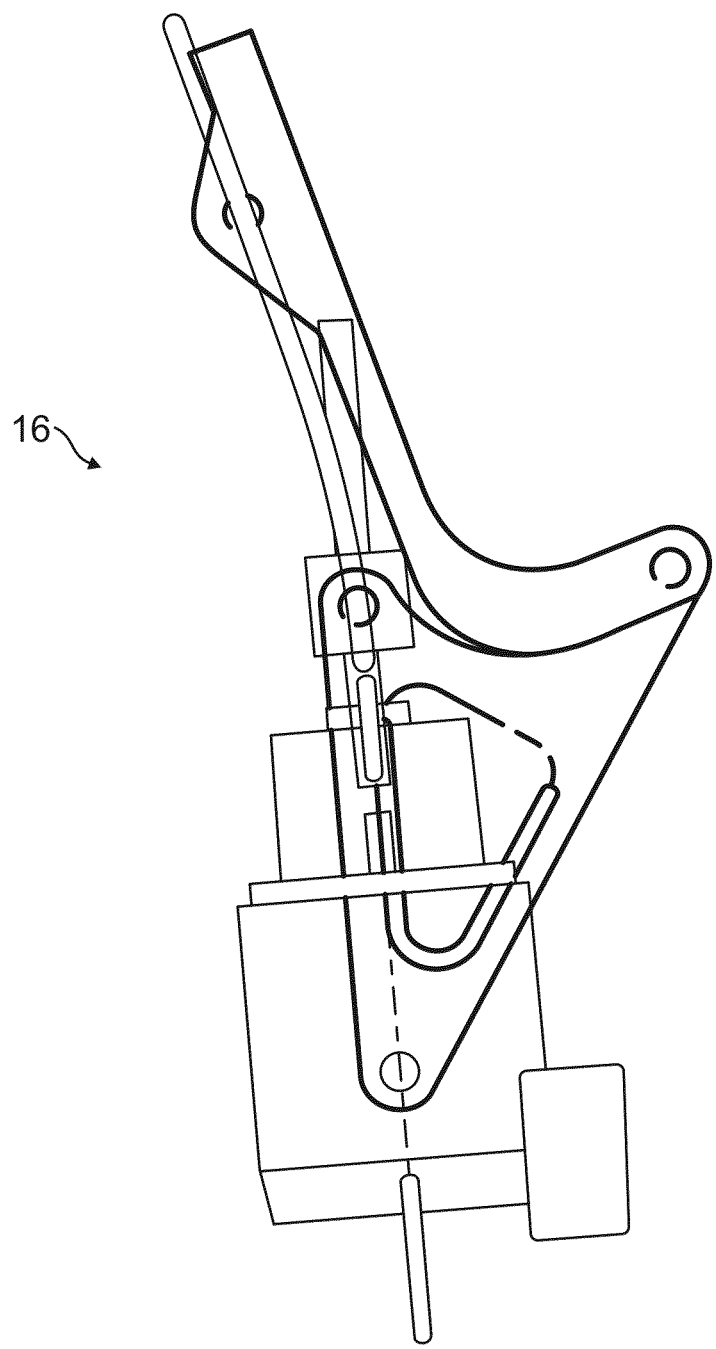
FIG. 6 is a side view of the drive train of the instant invention.

The drivetrain 20 as seen in FIG. 6 consists of a prime mover and motion transmission elements attached to the carriage 14 that moves it, with the patient 12, along the guide path. In different configurations, the prime mover can be an electric motor, a hydraulic or pneumatic cylinder, or an electromagnet. As illustrated herein, an electric motor/ball-screw configuration is shown.

Figure 7:
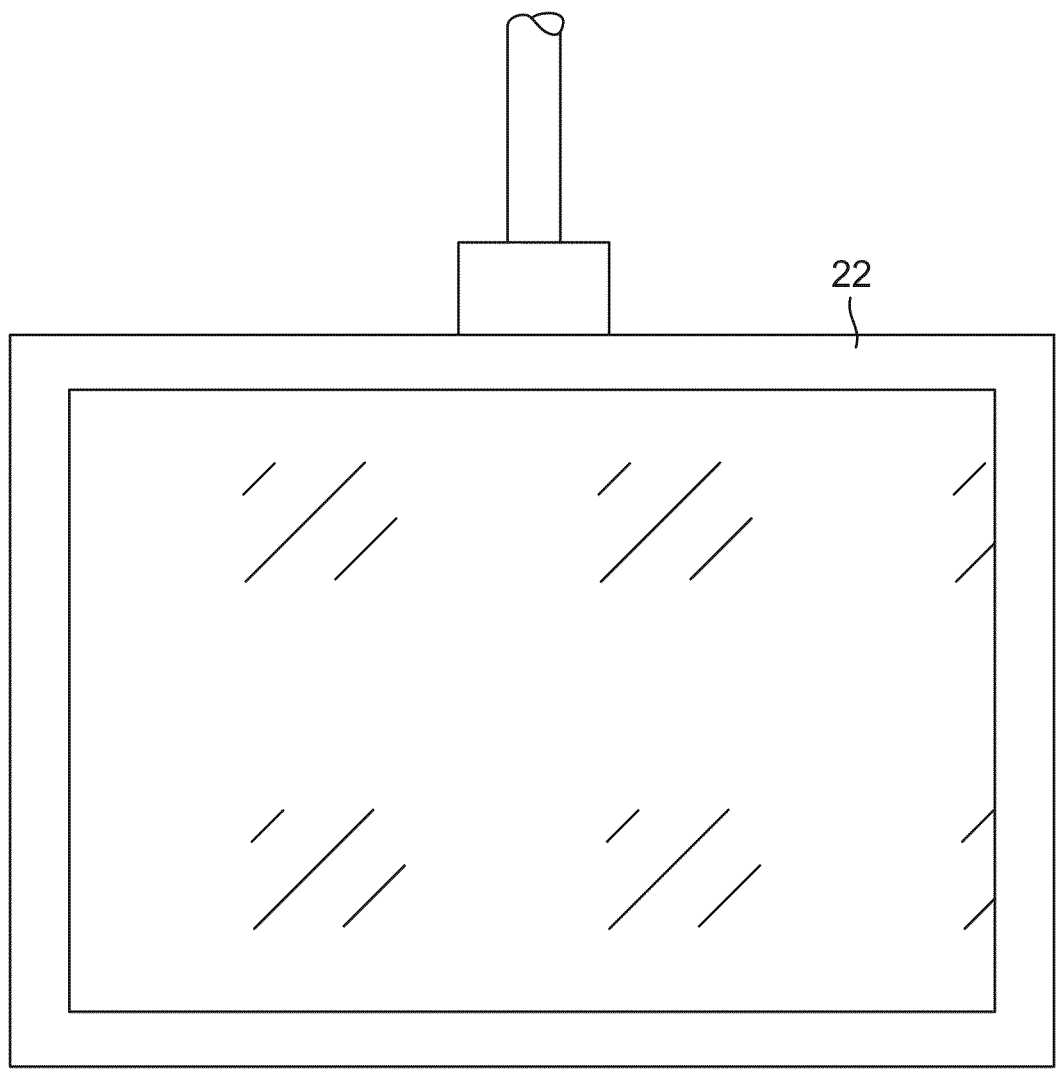
FIG. 7 is a clos up front view of the touchscreen of the instant invention.

The HMI 22 is a touchscreen as shown in FIG. 7 that allows the user, i.e., the patient 12 or a therapist, to interface with the invention and its control system. Typical interactions include, but are not limited to, entering patient profile information, reading alpha-numeric or graphical displays, setting upper and lower travel limits, choosing operating modes, and setting magnitude of lift assist force.

Figure 8:
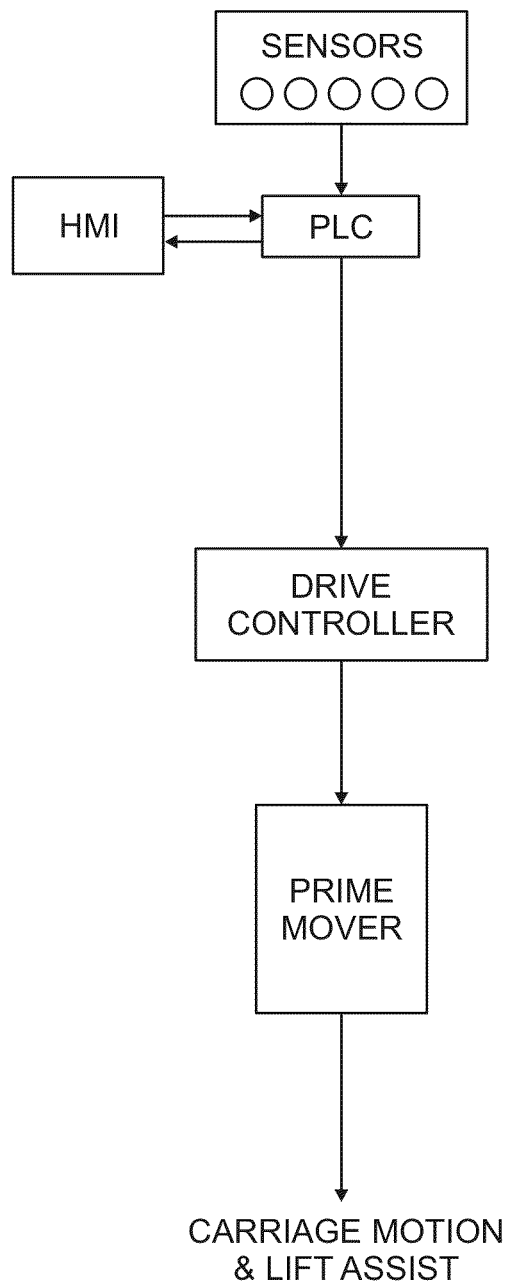
FIG. 8 is a schematic diagram of the electronic control system of the instant invention.

The electronic control system as shown in FIG. 8 integrates device input from sensors and the HMI with a PLC that is programmed according to a control algorithm to command the system outputs, primarily drive force and speed.

Figure 9:
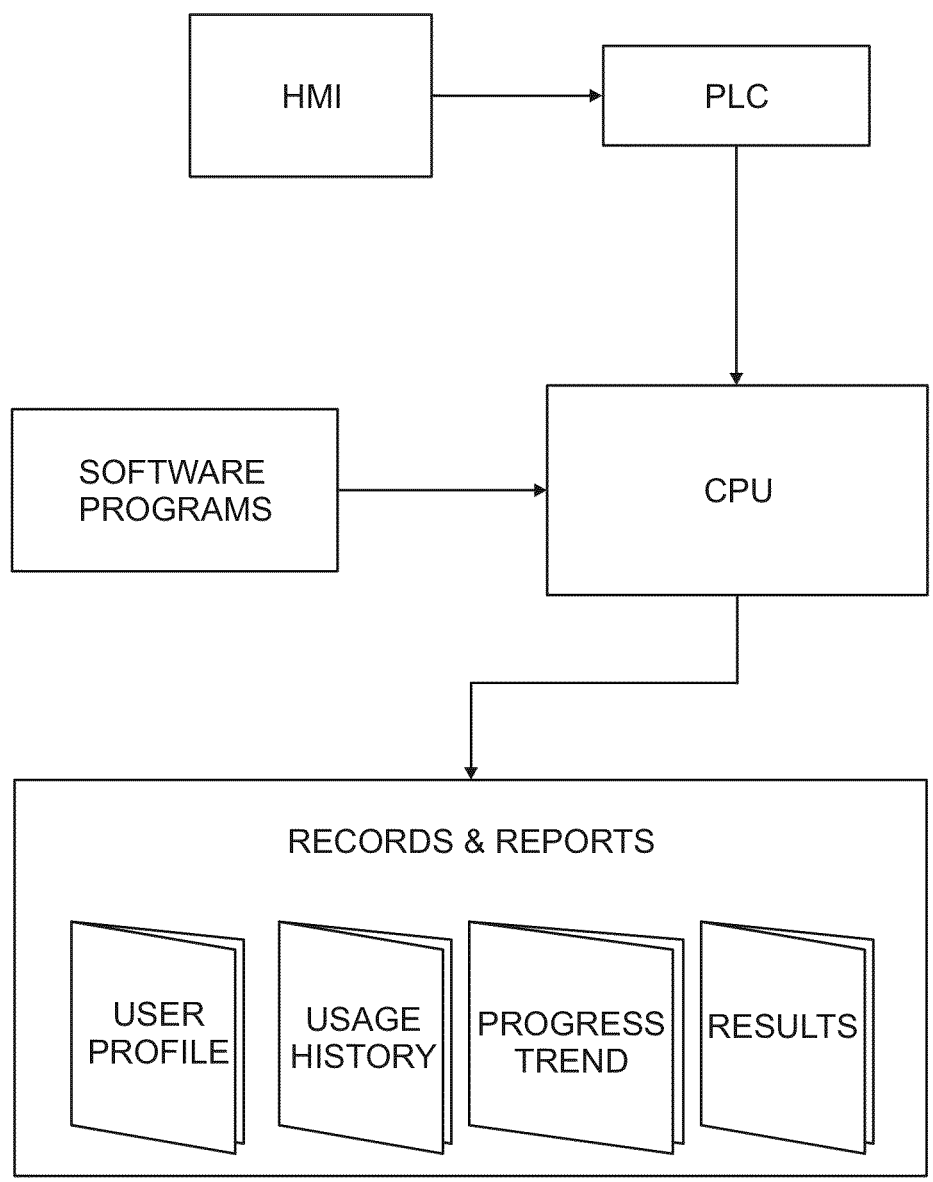
FIG. 9 is a flow chart of the data memory and management system of the instant invention.

A digital system memory is installed and stores individual patient usage data. Software programs in a CPU retrieve the data, and organize it into reports, as desired for review by the patient and therapist. Reports can include: patient profile, use history, progress trends, etc. The reports are useful for evaluation and verification of therapy effectiveness. (See FIG. 9.)

Figure 10:
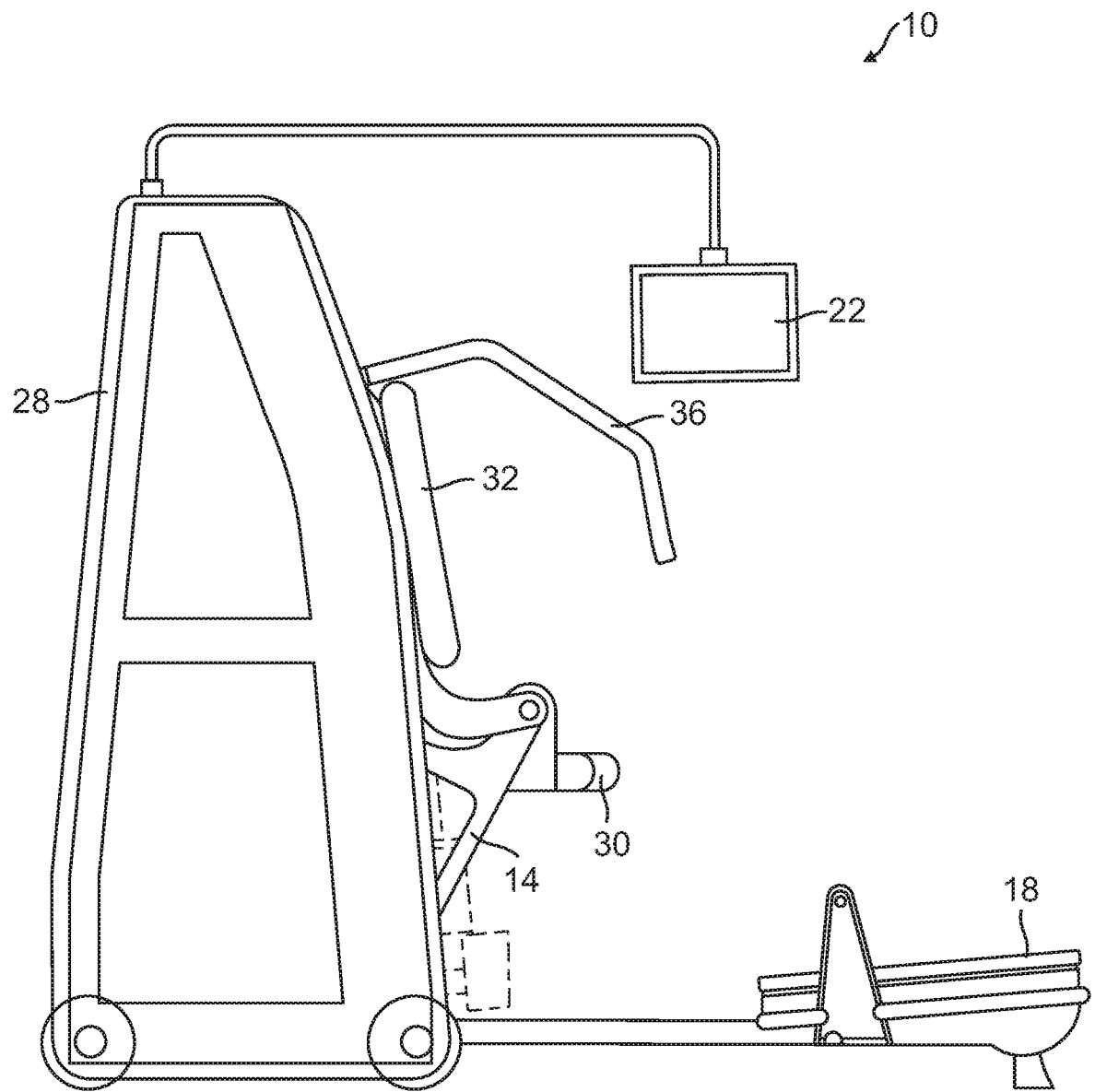
FIG. 10 is a side view of the frame, body and enclosure of the instant invention.

The frame and body structure 28 is shown in one configuration in FIG. 10. In addition to combining the other components into an integrated space, the enclosed body guards users from injury due to pinch points, electrical shock and other hazards. It is also designed for portability and stability.

The invention illustratively disclosed herein suitably may be practiced in the absence of any element which is not specifically disclosed herein.

The discussion included in this detailed description is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A rehabilitation device to facilitate and promote therapeutic rehabilitation of lower body disabilities comprising:
 a chair-like carriage that supports a patient through therapeutic movement, said chair-like carriage further comprising a footrest;
 a drivetrain that lifts said carriage through a proscribed path by a bearing follower mechanism on a machined curvilinear surface;
 a force plate in said footrest of said chair-like carriage that senses the magnitude of patient push effort;
 an electronic control system that coordinates sensor inputs, a PLC, and software programs to direct output motion according to an operational algorithm;
 an HMI touchscreen for a user to enter operative settings and display operating characteristics;
 a CPU for digital memory and data management software to collect, store and organize usage data; and
 a housing enclosure that provides for safety, stability and portability.

2. The rehabilitation device as defined in claim 1 wherein said chair-like carriage is an ergonomic support structure that further comprises: a seat, backrest, headrest, and a shoulder restraint.

3. The rehabilitation device as defined in claim 1 wherein said chair-like carriage is adjustable to accommodate patients of different anthropometric dimensions.

4. The rehabilitation device as defined in claim 1 further comprising programmable motion limits to protect a patient's mobility constraints.

5. The rehabilitation device as defined in claim 1 further comprising programmable lift force to assist a patient's strength limitation.

6. The rehabilitation device as defined in claim 1 further comprising programmable travel speed to optimize movement rate training.

7. The rehabilitation device as defined in claim 1 further comprising electromechanical switches to provide emergency safety override in the event of control system malfunction.

8. The rehabilitation device as defined in claim 1 wherein a guided motion is designed to provide natural biomechanical movement along a seated-to-standing path.

9. The rehabilitation device as defined in claim 1 further wherein said device is foldable and transportable.

10. The rehabilitation device as defined in claim 1 wherein said force plate in said footrest sends electric signals to a PLC that is proportional to patient push effort.

11. The rehabilitation device as defined in claim 1 further comprising an auto detect mode that senses the magnitude of push effort registered by said footrest and automatically adapts drivetrain output force to lift said chair-like carriage.

12. The rehabilitation device as defined in claim 1 wherein said carriage can be declined at variable degrees to compensate for patient instability during the upward standing movement.

13. The rehabilitation device as defined in claim 1 wherein a guide mechanism comprises padded, curved spinal support surfaces in the cervical, thoracic and lumbar regions.

14. The rehabilitation device as defined in claim 1 wherein a prime mover and motion transmission components assist a disabled patient to complete rehabilitative movements.

15. The rehabilitation device as defined in claim 1 further comprising precision lift control with increments of 0.1 or more pounds of force.

16. The rehabilitation device as defined in claim 1 further comprising precision position control with increments of 1 mm or more.

17. The rehabilitation device as defined in claim 1 further comprising precision speed control with increments of 1 mm/sec or more with smooth continuous motion.

18. The rehabilitation device as defined in claim 1 wherein said HMI touchscreen further comprises controls for: engaging a dialog for profile data entry; choosing from a menu of operating modes; establishing kinematic and kinetic movement parameters; counting and timing movement repetitions; and tracking, charting and displaying performance measurements.

\* \* \* \* \*